(12) United States Patent
Du et al.

(10) Patent No.: US 8,892,730 B2
(45) Date of Patent: Nov. 18, 2014

(54) PERFORMANCE MANAGEMENT IMPLEMENTATION METHOD AND NETWORK MANAGEMENT SYSTEM

(75) Inventors: Xianjun Du, Guangdong Province (CN); Jin Li, Guangdong Province (CN); Xiulin Wen, Guangdong Province (CN); Yan Zhou, Guangdong Province (CN); Hanzeng Song, Guangdong Province (CN); Chaoming Deng, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 382 days.

(21) Appl. No.: 13/258,446

(22) PCT Filed: May 12, 2010

(86) PCT No.: PCT/CN2010/072661
§ 371 (c)(1),
(2), (4) Date: Nov. 9, 2011

(87) PCT Pub. No.: WO2011/017947
PCT Pub. Date: Feb. 17, 2011

(65) Prior Publication Data
US 2012/0144027 A1 Jun. 7, 2012

(30) Foreign Application Priority Data
Aug. 11, 2009 (CN) .......................... 2009 1 0090872

(51) Int. Cl.
*G06F 15/173* (2006.01)
*H04L 12/24* (2006.01)

(52) U.S. Cl.
CPC .................................... *H04L 41/145* (2013.01)
USPC ........................................................ 709/224

(58) Field of Classification Search
None
See application file for complete search history.

(56) References Cited

U.S. PATENT DOCUMENTS

| 6,990,520 | B2 * | 1/2006 | Green et al. ................... 709/223 |
| 7,305,278 | B2 * | 12/2007 | Enright et al. ................. 700/115 |
| 7,451,175 | B2 * | 11/2008 | Green et al. ................... 709/200 |
| 7,814,142 | B2 * | 10/2010 | Mamou et al. ................. 709/203 |
| 7,908,365 | B2 * | 3/2011 | Sengupta et al. .............. 709/224 |
| 7,912,946 | B2 * | 3/2011 | Sengupta et al. .............. 709/224 |
| 7,979,245 | B1 * | 7/2011 | Bourlatchkov et al. ........... 703/2 |
| 8,379,538 | B2 * | 2/2013 | Rolia et al. ..................... 370/254 |
| 2003/0120764 | A1 | 6/2003 | Laye et al. |
| 2003/0236875 | A1 * | 12/2003 | Green et al. ................... 709/224 |
| 2006/0294439 | A1 * | 12/2006 | Rolia et al. ...................... 714/47 |
| 2007/0011299 | A1 * | 1/2007 | Farkas et al. ................... 709/224 |
| 2009/0193111 | A1 * | 7/2009 | Sengupta et al. .............. 709/224 |
| 2009/0193112 | A1 * | 7/2009 | Sengupta et al. .............. 709/224 |
| 2010/0115341 | A1 * | 5/2010 | Baker et al. ..................... 714/37 |

FOREIGN PATENT DOCUMENTS

| CN | 1741460 A | 3/2006 |
| CN | 101060435 A | 10/2007 |
| CN | 101420344 A | 4/2009 |

OTHER PUBLICATIONS

International Search Report for PCT/CN2010/072661 dated Aug. 6, 2010.

* cited by examiner

*Primary Examiner* — Brian P Whipple
(74) *Attorney, Agent, or Firm* — Ling Wu; Stephen Yang; Ling and Yang Intellectual Property (57) ABSTRACT

A method for implementing performance management and a network management system are disclosed in the present invention. The method for implementing performance management includes the following steps of: a network management system obtaining a performance management information model which is used for describing related information of all performance data that need to be collected; the network management system instantiating the performance management information model according to a current telecommunication network in application to obtain a performance management information model instance; the network management system collecting the performance data according to the performance management information model instance. The present invention may be applied in performance management in various specialized telecommunications networks.

8 Claims, 3 Drawing Sheets

PERFORMANCE MANAGEMENT IMPLEMENTATION METHOD AND NETWORK MANAGEMENT SYSTEM

TECHNICAL FIELD

The present invention relates to the technical field of network management, and in particular, to a method for implementing performance management and a network management system.

BACKGROUND OF THE RELATED ART

Performance management is one of the main managing functions in the telecommunication network management, and its purpose is to monitor the performance of the network, network elements or network devices, collect related performance data, evaluate the validity of the network and the network elements, report the state of the network devices, support network planning and network analysis, etc. The core of the whole flow of performance management is the performance data, and how to efficiently collect, store and inquire the performance data is the core issue of performance management.

Depending on implementation technique and the services provided, the existing telecommunication network can be divided into several specialized telecommunication networks, for example, fixed network, mobile network, etc. and currently, performance management of various specialized telecommunication networks is established separately according to the requirement of a certain specialized telecommunication network itself, and it is a hard problem to efficiently and collectively collect, store and inquire performance data for different specialized telecommunication networks.

SUMMARY OF THE INVENTION

In view of the above, the examples of the present invention provide a method for implementing performance management and a network management system, which can be applied in performance management in various specialized telecommunications networks.

In order to solve the above problem, the embodiment of the present invention is implemented as follows:

A method for implementing performance management comprises the following steps of:

a network management system obtaining a performance management information model, and said performance management information model being used for describing related information of all performance data that need to be collected;

the network management system instantiating the performance management information model according to a current telecommunication network in application to obtain a performance management information model instance; and, the network management system collecting the performance data according to the performance management information model instance.

The performance management information model contains the following contents: network element type description information, network element positioning information description information, network element measurement type description information and measurement type counter description information.

Said step of the network management system instantiating the performance management information model according to a current telecommunication network in application to obtain a performance management information model instance is preferably:

the network management system instantiating the network element type description information, network element positioning information description information, network element measurement type description information and measurement type counter description information respectively according to the current telecommunication network in application to obtain a network element type instance, a network element positioning information instance, a network element measurement type instance and a measurement type counter instance;

said step of the network management system collecting the performance data according to the performance management information model instance is preferably:

the network management system obtaining network element location information to which the performance data that need to be collected belong and counter information corresponding to all measurement types corresponding to the network element type instance according to said performance management information model instance, and collecting the performance data according to the network element location information to which the performance data belong and the counter information corresponding to all measurement types.

Said step of the network management system obtaining network element location information to which the performance data that need to be collected belong and counter information corresponding to all measurement types corresponding to the network element type instance according to said performance management information model instance is preferably:

the network management system obtaining the network element location information to which the performance data that need to be collected belong according to the network element type instance and the network element positioning information instance corresponding to the network element type instance;

the network management system obtaining all measurement types corresponding to the network element type instance from the network element measurement type instance corresponding to the network element type instance according to the network element type instance;

the network management system obtaining the counter information corresponding to all measurement types from the measurement type counter instance.

After the network management system collects the performance data according to the performance management information model instance, the method further comprises the following step of:

the network management system making the collected performance data persistent according to the performance management information model instance.

A network management system, comprising:

an obtaining module used to obtain a performance management information model, wherein said performance management information model is used for describing related information of all performance data that need to be collected;

an instantiating module used to instantiate the performance management information model according to a current telecommunication network in application to obtain a performance management information model instance; and a collecting module used to collect the performance data according to the performance management information model instance.

The performance management information model contains the following contents: network element type description information, network element positioning information description information, network element measurement type description information and measurement type counter description information.

The instantiating module is used to instantiate the network element type description information, network element positioning information description information, network element measurement type description information and measurement type counter description information respectively according to the current telecommunication network in application to obtain a network element type instance, a network element positioning information instance, a network element measurement type instance and a measurement type counter instance;

the collecting module is used to obtain network element location information to which the performance data that need to be collected belong and counter information corresponding to all measurement types corresponding to the network element type instance according to said performance management information model instance, and collect the performance data according to the network element location information to which the performance data belong and the counter information corresponding to all measurement types.

The collecting module comprises:

a first obtaining unit used to obtain the network element location information to which the performance data that need to be collected belong according to the network element type instance and the network element positioning information instance corresponding to the network element type instance;

a second obtaining unit used to obtain all measurement types corresponding to the network element type instance from the network element measurement type instance corresponding to the network element type instance according to the network element type instance;

a third obtaining unit used to obtain the counter information corresponding to all measurement types from the measurement type counter instance;

an executing unit used to collect the performance data according to the network element location information of the performance data and the counter information corresponding to all measurement types.

The system further comprises a persistent module used to make the collected performance data persistent according to the performance management information model instance.

The examples of the present invention have the following beneficial effects:

the network management system uses a uniform performance management information model, instantiates the performance management information model according to a current telecommunication network in application, and achieves collection of performance data according to a performance management information model instance obtained after instantiation, and since the performance management module can describe the related information of all performance data that need to be collected, the network management system is applicable to performance management in various specialized telecommunications networks, thus improving the portability and reusability of the network management system.

SPECIFIC EMBODIMENTS

The specific embodiments of the present invention will be described in further detail below with reference to the drawings and the examples.

Figure 1:
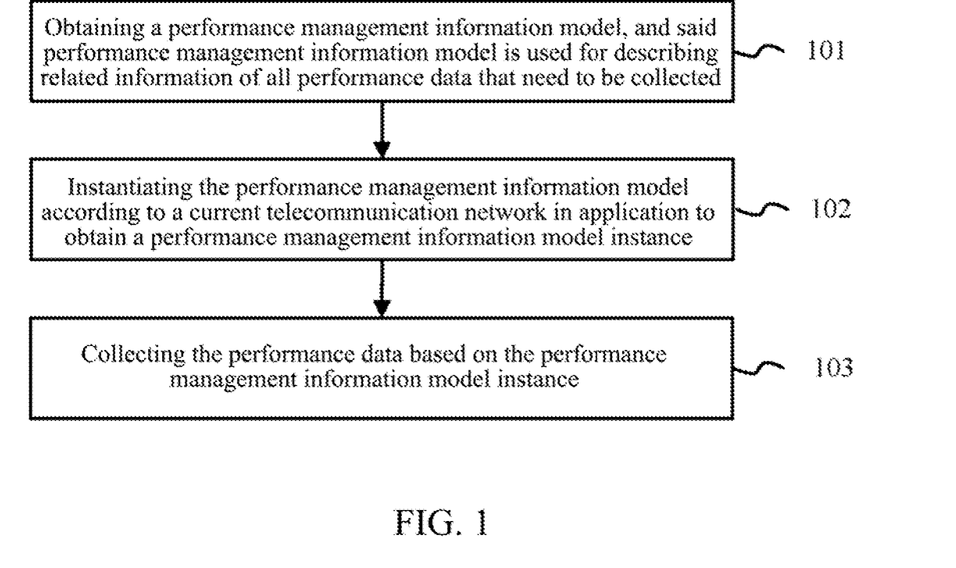
FIG. 1 is a flow chart of the method for implementing performance management according to an example of the present invention.

As shown in FIG. 1, it illustrates the flow of the method for implementing performance management according to an example of the present invention, wherein the method for implementing performance management can be applied to various specialized telecommunication networks and specifically comprises the following steps:

Step 101: the network management system obtains a performance management information model, and said performance management information model is used for describing related information of all performance data that need to be collected, such as information like network element type to which the performance data belong, network element measurement type, measurement type counter, etc.

Step 102: the network management system instantiates the performance management information model according to a current telecommunication network in application to obtain a performance management information model instance. The so-called instantiating means a process of concretizing the related information of the performance data described in the performance management information model. Suppose the telecommunication network to which the network management system is currently applied is CDMA (Code Division Multiple Access) wireless network, then the performance management information model needs to be concretized according to the network structure and functions of various network elements of the CDMA wireless network and so on, for example: a CDMA wireless network mainly includes: a HLR (Home Location Register), a MSC (Mobile Switching Center), and a BSC (Base Station Controller) and so on, therefore, the network element types after instantiation include: HLR, MSC and BSC, etc.

Step 103: the network management system collects the performance data according to the performance management information model instance.

Performance data are actually a measurement of the service indicator of the network element bearer in the telecommunication network, therefore, the performance management information model is mainly for describing the service indicator of the network element bearer. The performance management information model may contain the following contents: network element type description information, network element positioning information description information, network element measurement type description information and measurement type counter description information. Definitions of the above four kinds of description information can cover the related information of all performance data that need to be collected in the current telecommunication network.

Wherein, the network element type description information is an abstraction of various network element devices in the telecommunication network, and may specifically include the following contents: network element type serial number, network element type name, the number of positioning types of network element type and so on, wherein, the number of positioning types of network element type refers to the number of the network element positioning layers where the network elements are located in the telecommunication network. Suppose there are two network element types in a CDMA wireless network, namely, network management server and BSC under its node, then the number of positioning type of the network management server is 1, which indicates that the network management server is located in the first layer of the CDMA wireless network, and the number of positioning types of the BSC is 2, which indicates that the BSC is located in the second layer of the CDMA wireless network.

The network element positioning information description information is an abstraction of the positions of the network element in the telecommunication network, and may specifically include the following contents: network element type serial number, network element positioning parameter sequence number, type serial number of network element positioning parameters, network element positioning parameter storage name, data type of network element positioning parameters (for example, integer type, floating-point type), etc.

The network element measurement type description information is an abstraction of various measurement types of the network element, and may specifically include the following contents: network element type serial number, measurement type serial number, measurement type name, measurement type description, measurement type storage mode, etc. The measurement type refers to the type of the performance data that need to be collected, and by taking BSC as an example, its measurement type may include: call statistics, switch statistics and the like.

The measurement type counter description information is an abstraction of the counter objects of various measurement types of the network element, and may specifically include the following contents: measurement type serial number, counter serial number, counter name, counter storage name and counter data type. By taking BSC as an example, its measurement type of "call statistics" may include the following counters: call attempt times, call success times, call failure times, etc.

The performance management information model of the above example is applicable to performance management of most telecommunication networks, and of course, other description information may also be added to the performance management information model as required in order to meet requirements of development.

According to the above performance management information model, the above step 102 may be specifically implemented as: the network management system instantiating the network element type description information, network element positioning information description information, network element measurement type description information and measurement type counter description information respectively according to the current telecommunication network in application to obtain a network element type instance, a network element positioning information instance, a network element measurement type instance and a measurement type counter instance.

Instantiation of the performance management information model will be described in further detail below by taking a CDMA wireless network as an example.

Step one: instantiation of network element type description information

A CDMA wireless network mainly manages BSC, besides, in a common network management system, a network management server itself is regarded as a network element type, therefore description will be made by taking two network element types of network management server and BSC as an example in this example of the present invention. Of course, a CDMA wireless network also includes other network element types, which will not be described in detail here.

Step two: instantiation of network element positioning information description information. Instantiation is implemented for different network element types respectively, wherein, the network element positioning of the network management server is one layer, i.e. itself, while the network element positioning of the BSC is two layers, the first one being the network management server and the second being the BSC itself.

Step three: instantiation of network element measurement type description information. By taking BSC as an example, it is supposed that the measurement type of BSC includes "switch statistics" and "call statistics".

Step four: instantiation of measurement type counter description information. Instantiation of measurement type counter description information is implemented by taking "call statistics" in BSC as an example, and it is supposed that the counter information of "call statistics" includes: "call attempt times", "call success times", and "total call times", wherein, the data type of each counter is defined as integer type.

After instantiation of the performance management information module is completed, the network management system can collect performance data according to the performance management information module instance, and the above step 103 may be specifically implemented as: the network management system obtaining network element location information to which the performance data that need to be collected belong and counter information corresponding to all measurement types corresponding to the network element type instance according to the performance management information model instance, and collecting the performance data according to the network element location information to which the performance data belong and the counter information corresponding to all measurement types.

Figure 2:
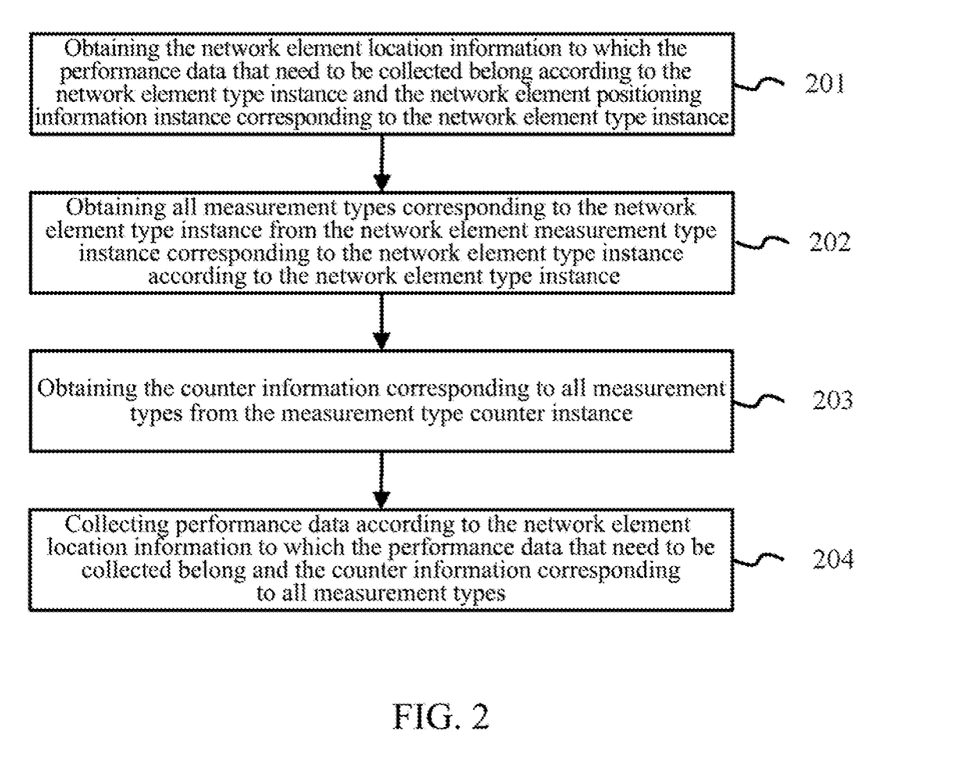
FIG. 2 is a flow chart of the method for performance data collection according to an example of the present invention.

FIG. 2 illustrates the flow of the method for performance data collection according to an example of the present invention, and the above step 103 may further comprise the following steps:

Step 201, the network management system obtains the network element location information to which the performance data that need to be collected belong according to the network element type instance and the network element positioning information instance corresponding to the network element type instance; by taking the BSC in the above example as an example, it is known from the positioning information instance corresponding to the BSC that the positioning information of the BSC includes two layers, namely, the network management server and BSC, therefore, it is determined that the location information of the performance data that need to be collected is SERVER=XXX, BSC=YYY, wherein, XXX and YYY represent the specific location information of the network management server and BSC respectively.

Step 202, the network management system obtains all measurement types corresponding to the network element type instance from the network element measurement type instance corresponding to the network element type instance according to the network element type instance; also by taking the BSC as an example, it is acquired from the network element measurement type instance of BSC that the measurement type of the BSC includes: "call statistics", and "switch statistics".

Step 203: the network management system obtains the counter information corresponding to all measurement types from the measurement type counter instance; by taking the above "call statistics" as an example, the counter information of the "call statistics" is acquired from the measurement type counter instance of the "call statistics", and it is supposed that the acquired counter of the "call statistics" includes: "call attempt times", "call success times", and "call failure times", and meanwhile, information such as the data type of each counter also needs to be acquired.

Step 204, the network management system collects performance data according to the network element location information to which the performance data that need to be collected belong and the counter information corresponding to all measurement types. Specifically, the network management system can collect performance data from an upper-level network management system or a lower-level network management system of the network element device via a lower-level network management or a foreground network element performance interface, and after the performance data are collected, it also needs to achieve format conversion of the performance data to convert the format of the performance data into a recognizable data format.

Figure 3:
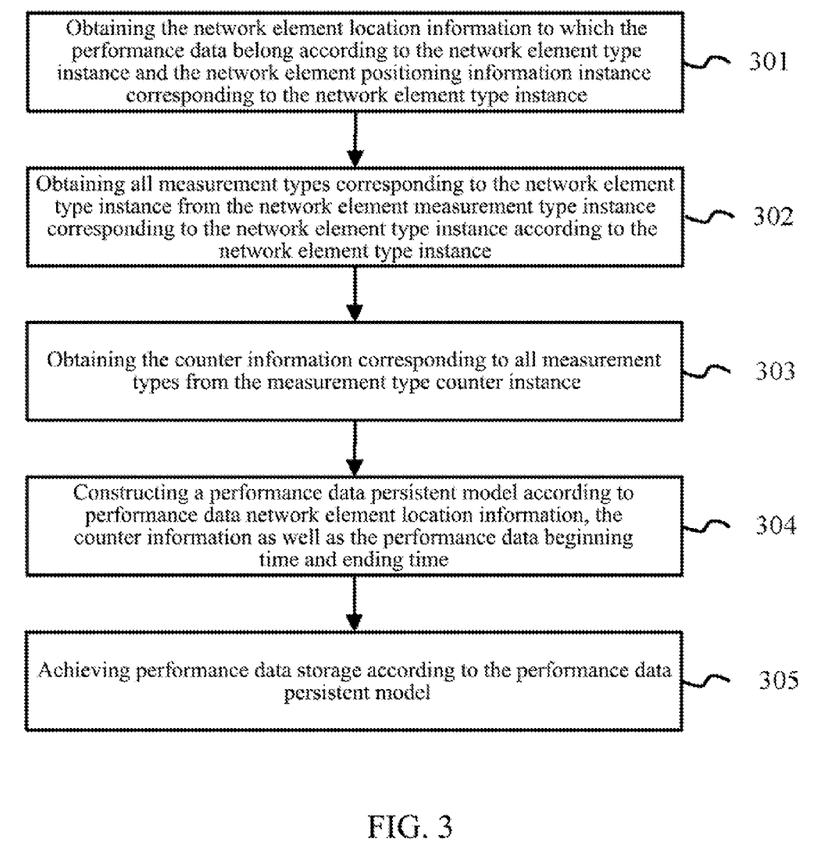
FIG. 3 is a flow chart of the method for making performance data persistent according to an example of the present invention.

After collection of the performance data is completed, the network management system also needs to make the collected performance data persistent according to the performance management information model instance, i.e., achieving storage of the performance data. Generally, a complete piece of performance data is composed of a beginning time and an ending time of the data, the network element location information to which the performance data belong, the measurement type counter information, and the like. Therefore, as shown in FIG. 3, the flow of the method for making the performance data persistent according to the example of the present invention specifically includes the following steps:

Step 301, the network management system obtains the network element location information to which the performance data belong according to the network element type instance and the network element positioning information instance corresponding to the network element type instance.

Step 302, the network management system obtains all measurement types corresponding to the network element type instance from the network element measurement type instance corresponding to the network element type instance according to the network element type instance.

Step 303, the network management system obtains the counter information corresponding to all measurement types from the measurement type counter instance.

Step 304, the network management system constructs a performance data persistence model according to the network element location information to which the performance data belong and the counter information corresponding to all measurement types, as well as the performance data beginning time and ending time.

Step 305, the network management system achieves performance data storage according to the performance data persistence model. The network management system can store the collected performance data through a storage mechanism such as file or database.

The structure of the performance data stored in the network management system is shown in Table 1:

| Beginning time (Begintime) | Ending time (Endtime) | Network element location 1 (ServerID) | Network element location 2 (BSCID) | Counter 1 (call attempt times) | Counter 2 (call success times) |
|---|---|---|---|---|---|
| 2008-01-01:00:00 | 2008-01-01:01:00 | 10001 | 2 | 18 | 16 |

After the performance data are made persistent, the performance data may also be inquired and displayed according to the requirements of the client, which specifically includes:

the network management system obtaining the measurement type corresponding to the network element type from the network element measurement type instance corresponding to the network element type according to the network element type selected by the user, and displaying the measurement type to the user for the user to select;

the network management system obtaining the counter information corresponding to the measurement type from the measurement type counter instance corresponding to the measurement type according to the measurement type selected by the user and displaying the counter information to the user for the user to select;

the network management system obtaining the network element positioning information corresponding to the network element type from the network element positioning information instance corresponding to the network element type according to the network element type selected by the user and constructing a network element location tree or table on the displaying interface for the user to select; for example, when the user selects the network element type of BSC, a network element location tree with the network management server as the parent node and the BSC as the child node being generated on the interface.

The network management system obtains the beginning time and ending time of the performance data selected by the user;

the network management system complete configuration of inquiry conditions according to the above selection of the user, thereby inquiring the performance data in the persistent data according to the obtained inquiry conditions. Of course, in the specific process of inquiring the performance data, not all of the above information for constructing inquiry conditions needs to be selected, and part of the information may be merely selected, for example, when the measurement type counter information is not selected, it may be defaulted that all counter) information under the current measurement type is selected.

With the method for implementing performance management provided by the above example, a uniform performance management information model is used, performance management information model is instantiated according to a current telecommunication network in application, and collection of performance data is achieved according to a performance management information model instance obtained after instantiation, and since the performance management module can describe the related information of all performance data that need to be collected, the network management system is applicable to performance management in various specialized telecommunications networks, thus improving the portability and reusability of the network management system.

Figure 4:
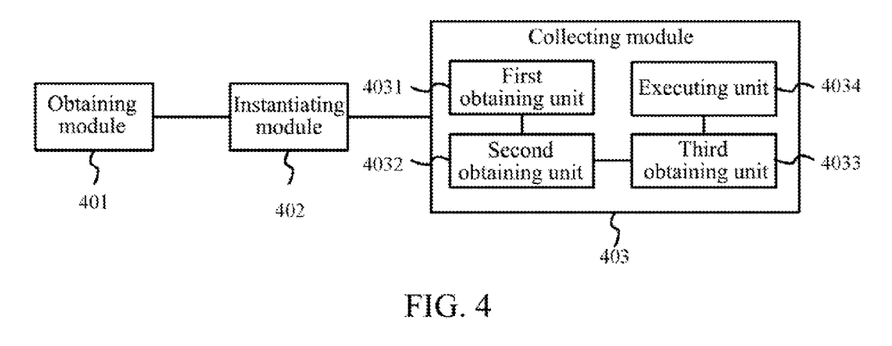
FIG. 4 is a schematic diagram of the structure of the network management system according to an example of the present invention.

FIG. 4 illustrates the structure of the network management system according to an example of the present invention, and the network management system includes:

an obtaining module 401 used to obtain a performance management information model, wherein said performance management information model is used for describing related information of all performance data that need to be collected, such as information like network element type to which the performance data belong, network element measurement type, measurement type counter and so on;

an instantiating module 402 used to instantiate the performance management information model according to a current telecommunication network in application to obtain a performance management information model instance; and, a collecting module 403 used to collect the performance data according to the performance management information model instance.

Performance data are actually a measurement of the service indicator of the network element bearer in the telecommunication network, therefore, the performance management information model is mainly for describing the service indicator of the network element bearer. The performance management information model may contain the following contents: network element type description information, network element positioning information description information, network element measurement type description information and measurement type counter description information. Definitions of the above four kinds of description information can cover the related information of all performance data that need to be collected in the current telecommunication network.

Wherein, the network element type description information is an abstraction of various network element devices in the telecommunication network, and may specifically include the following contents: network element type serial number, network element type name, the number of positioning types of network element type, etc.

The network element positioning information description information is an abstraction of the positions of the network element in the telecommunication network, and may specifically include the following contents: network element type serial number, network element positioning parameter sequence number, type serial number of network element positioning parameters, network element positioning parameter storage name, data type of network element positioning parameters (for example, integer type, floating-point type), etc.

The network element measurement type description information is an abstraction of various measurement types of the network element, and may specifically include the following contents: network element type serial number, measurement type serial number, measurement type name, measurement type description, measurement type storage mode, etc.

The measurement type counter description information is an abstraction of the counter objects of various measurement types of the network element, and may specifically include the following contents: measurement type serial number, counter serial number, counter name, counter storage name and counter data type.

At this time, the instantiating module 402 is further used to instantiate the network element type description information, network element positioning information description information, network element measurement type description information and measurement type counter description information respectively according to the current telecommunication network in application to obtain a network element type instance, a network element positioning information instance, a network element measurement type instance and a measurement type counter instance.

The collecting module is further used to obtain network element location information to which the performance data that need to be collected belong and counter information corresponding to all measurement types corresponding to the network element type instance according to said performance management information model instance, and collect the performance data according to the network element location information to which the performance data belong and the counter information corresponding to all measurement types.

Specifically, the collecting module 403 may further comprise:

a first obtaining unit 4031 used to obtain the network element location information to which the performance data that need to be collected belong according to the network element type instance and the network element positioning information instance corresponding to the network element type instance;

a second obtaining unit 4032 used to obtain all measurement types corresponding to the network element type instance from the network element measurement type instance corresponding to the network element type instance according to the network element type instance;

a third obtaining unit 4033 used to obtain the counter information corresponding to all measurement types from the measurement type counter instance;

an executing unit 4034 used to collect the performance data according to the network element location information of the performance data need to be collected and the counter information corresponding to all measurement types.

Figure 5:
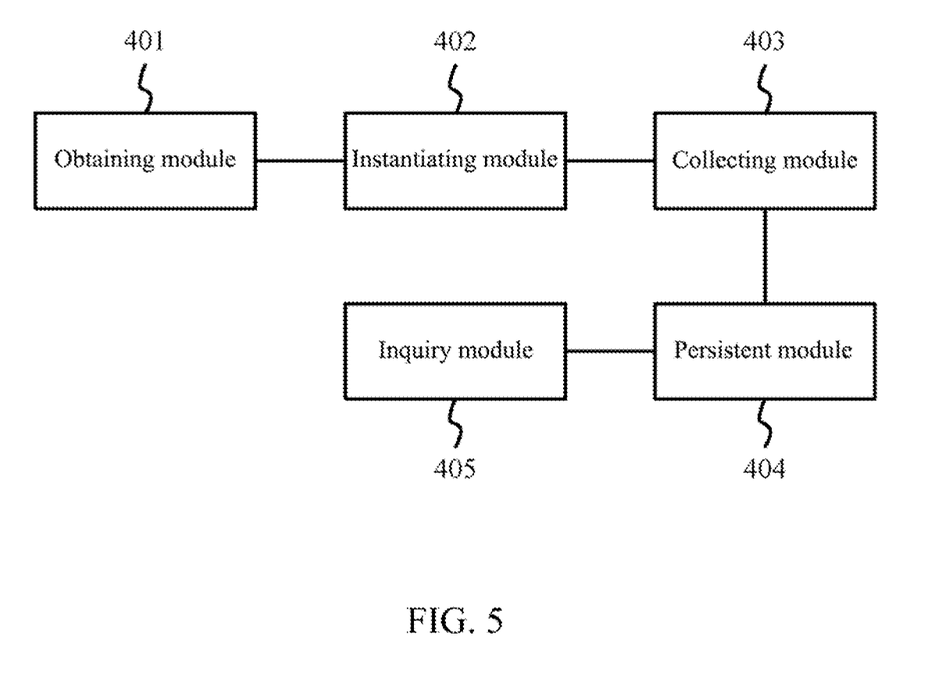
FIG. 5 is a schematic diagram of another structure of the network management system according to an example of the present invention.

After collection of the performance data is completed, the network management system also needs to make the collected performance data persistent, i.e., achieving storage of the performance data. Therefore, as shown in FIG. 5, the network management system further comprises: a persistent module 404 used to make the collected performance data persistent according to the performance management information model instance.

After the performance data are made persistent, the performance data may also be inquired and displayed according to the requirements of the client. Therefore, the network management system further comprises: an inquiry module 405 used to inquire the performance data that meet the preset inquiry conditions in the persistent performance data.

The network management system provided in the above example uses a uniform performance management information model, and instantiates the performance management information model according to a current telecommunication network in application, and achieves collection of performance data according to a performance management information model instance obtained after instantiation, and since the performance management module can describe the related information of all performance data that need to be collected, the network management system is applicable to performance management in various specialized telecommunications networks, thus improving the portability and reusability of the network management system.

The above described are only preferred embodiments of the present invention, and it should be pointed out that a person skilled in the art can make several improvements and modifications without departing from the principle of the present invention, and these improvements and modifications shall also be regarded to be within the protection scope of the present invention.

What is claimed is:

1. A method for implementing performance management, comprising the following steps of:

obtaining, by a network management system, a performance management information model which is used for describing related information of all performance data that need to be collected;

instantiating, by the network management system, the performance management information model according to a current applied telecommunication network to obtain a performance management information model instance; and collecting, by the network management system, the performance data according to the performance management information model instance;

wherein, the performance management information model contains network element type description information, network element positioning information description information, network element measurement type description information and measurement type counter description information; and wherein, the step of instantiating, by the network management system, the performance management information model according to a current applied telecommunication network to obtain a performance management information model instance is:

instantiating, by the network management system, the network element type description information, the network element positioning information description information, the network element measurement type description information and the measurement type counter description information respectively according to the current applied telecommunication network to obtain a network element type instance, a network element positioning information instance, a network element measurement type instance and a measurement type counter instance.

2. The method for implementing performance management according to claim 1, wherein, the step of collecting, by the network management system, the performance data according to the performance management information model instance is:

obtaining, by the network management system, network element location information of a corresponding network element to which the performance data that need to be collected belong and counter information corresponding to all measurement types corresponding to the network element type instance according to the performance management information model instance, and collecting the performance data according to the network element location information of the corresponding network element to which the performance data belong and the counter information corresponding to all measurement types.

3. The method for implementing performance management according to claim 2, wherein, the step of obtaining, by a network management system, network element location information of a corresponding network element to which the performance data that need to be collected belong and counter information corresponding to all measurement types corresponding to the network element type instance according to the performance management information model instance is:

obtaining, by the network management system, the network element location information of the corresponding network element to which the performance data that need to be collected belong according to the network element type instance and the network element positioning information instance corresponding to the network element type instance;

obtaining, by the network management system, all measurement types corresponding to the network element type instance from the network element measurement type instance corresponding to the network element type instance according to the network element type instance;

obtaining, by the network management system, the counter information corresponding to all measurement types from the measurement type counter instance.

4. The method for implementing performance management according to claim 1, wherein, after the network management system collects the performance data according to the performance management information model instance, the method further comprises the following step of:

making, by the network management system, collected performance data persistent according to the performance management information model instance.

5. A network management system, comprising: a processor, and a storage device for storing computer executable instructions that when executed by the processor cause the processor to perform the steps in following modules:

an obtaining module used to obtain a performance management information model which is used for describing related information of all performance data that need to be collected;

an instantiating module used to instantiate the performance management information model according to a current applied telecommunication network to obtain a performance management information model instance; and a collecting module used to collect the performance data according to the performance management information model instance;

wherein, the performance management information model contains following contents: network element type description information, network element positioning information description information, network element measurement type description information and measurement type counter description information; and the instantiating module is further used to instantiate the network element type description information, the network element positioning information description information, the network element measurement type description information and the measurement type counter description information respectively according to the current applied telecommunication network to obtain a network element type instance, a network element positioning information instance, a network element measurement type instance and a measurement type counter instance.

6. The network management system according to claim 5, wherein, the collecting module is further used to obtain network element location information of a corresponding network element to which the performance data that need to be collected belong and counter information corresponding to all measurement types corresponding to the network element type instance according to the performance management information model instance, and collect the performance data according to the network element location information of the corresponding network element to which the performance data belong and the counter information corresponding to all measurement types.

7. The network management system according to claim 6, wherein, the collecting module comprises:

a first obtaining unit used to obtain the network element location information of the corresponding network element to which the performance data that need to be collected belong according to the network element type instance and the network element positioning information instance corresponding to the network element type instance;

a second obtaining unit used to obtain all measurement types corresponding to the network element type instance from the network element measurement type instance corresponding to the network element type instance according to the network element type instance;

a third obtaining unit used to obtain the counter information corresponding to all measurement types from the measurement type counter instance; and an executing unit used to collect the performance data according to the network element location information of the performance data and the counter information corresponding to all measurement types.

8. The network management system according to claim 5, wherein, the storage device is for storing computer executable instructions that when executed by the processor cause the processor to perform further steps in the following further module:

a persistent module used to make collected performance data persistent according to the performance management information model instance.

* * * * *